United States Patent [19]

Ziegler et al.

[11] Patent Number: 4,848,923
[45] Date of Patent: Jul. 18, 1989

[54] METHOD AND SYSTEM TO TRANSMIT SIGNALS BEING GENERATED BY A MEASURING SENSOR, AND SPECIFICALLY A TEMPERATURE SENSOR

[75] Inventors: Horst Ziegler, Paderborn; Hermann Brendecke, Kleinostheim; Veit Hauptmann, Grosskrotzenburg, all of Fed. Rep. of Germany

[73] Assignee: W.C. Heraeus GmbH, Hanau, Fed. Rep. of Germany

[21] Appl. No.: 102,111

[22] Filed: Sep. 29, 1987

[30] Foreign Application Priority Data

Oct. 4, 1986 [DE] Fed. Rep. of Germany ....... 3633939

[51] Int. Cl.⁴ ..................... G04B 17/20; H03K 13/18
[52] U.S. Cl. .................................... 374/117; 331/66; 340/870.17; 374/102; 374/131; 374/178
[58] Field of Search ................... 374/117, 102; 331/66; 310/68 C; 340/870.17

[56] References Cited

U.S. PATENT DOCUMENTS

| 3,384,837 | 5/1968 | Toussaint et al. | 331/66 X |
| 3,486,023 | 12/1969 | McKeown. | |
| 3,860,863 | 1/1975 | Lamprecht | 331/66 X |
| 4,249,418 | 10/1981 | Ebata | 340/870.26 X |
| 4,518,839 | 5/1985 | Taguchi et al. | 340/870.17 |
| 4,537,515 | 8/1985 | Dinger et al. | 331/66 X |

FOREIGN PATENT DOCUMENTS

| 0010862 | 5/1980 | European Pat. Off. | 331/66 |
| 1848306 | 3/1962 | Fed. Rep. of Germany. | |
| 3128706 | 6/1983 | Fed. Rep. of Germany. | |

OTHER PUBLICATIONS

R. Wenger, "Schaltungstechnik eines Temperaturmesssenders", Int'l Elektronische Rundschau, 1973, No. 3, pp. 70–71.
Aschmoneit, "Schwingkreis als Sensor", Elektronik, 1983, p. 30.
Cordes, "Messdaten drahtlos übertragen", Elektronik 1983, pp. 70–71.
Israel, "Datenübertragung mit Lichtsignalen", Funkschau, pp. 64–69, Aug. 1986.

Primary Examiner—Daniel M. Yasich
Attorney, Agent, or Firm—Frishauf, Holtz, Goodman & Woodward, P.C.

[57] ABSTRACT

Temperature measurement is effectively carried out by converting pulses derived from a pulse generator, in which the pulse gaps change as a result of a measured condition, for example temperature, by converting electrical pulses received from the pulse generator into light pulses, and then evaluating the light pulses with respect to a clock rate in a counter (22). The light pulses can readily be transmitted via a light pickup (9b) and fiber optic or the like (9a) to a remote evaluation unit. Preferably, the light is generated by a light emitting diode or a laser diode (8'), serially connected with a switching transistor (13') and energized upon receipt of a pulse from the pulse generator. The arrangement permits use of a piezoelectric element (2) such as a frequency determining quartz to control the frequency of an oscillator, the frequency of which is then converted into the pulses with the respective pulse gaps.

20 Claims, 2 Drawing Sheets

METHOD AND SYSTEM TO TRANSMIT SIGNALS BEING GENERATED BY A MEASURING SENSOR, AND SPECIFICALLY A TEMPERATURE SENSOR

Cross-reference to related patent, the disclosure of which is hereby incorporated by reference: U.S. Pat. No. 3,486,023.

The present invention relates to a method and apparatus and system to transmit signals which are generated by a sensor, especially a temperature sensor, as a sequence of electrical pulses and in which the temporal spacing of the pulses is a function of the measured value.

BACKGROUND

Sensors to determine use of heat with remote measuring are known - see for example German Patent No. 31 28 706 by the inventor hereof. According to this disclosure, a temperature sensor provides a frequency modulated measuring signal, representative of the temperature being sensed. The temperature sensor is located at the heat consumption or heat utilization position. The signals provide a group of pulses, which are pulse interval or space modulated. Transfer of the signals to an evaluation circuit is obtained over ordinary electric lines.

It is possible to connect a plurality of utilization points, and the sensors associated therewith, to a central evaluation unit in accordance with the teaching of the aforementioned patent. This is possible, however, only by transmission over electric lines. Electric lines, as known, are subject to external disturbances and noise influences. In large, complex installations, it is difficult to provide a clear and unambiguous association of temperature sensors, and terminals of a, or a plurality of evaluation units with respect to each other. Arrangements quickly become complex and difficult to maintain or repair.

THE INVENTION

It is an object to provide a simplified method and system to transmit sensed parameter signals, typically temperature signals, which are not subject to disturbance or noise influences and which are simple and readily combined with existing units.

Briefly, a time base is provided, and the electrical signals are then converted into light pulses, which light pulses are then evaluated with respect to the time base. The light pulses can readily be reconverted into electrical pulses by means of a photodetector, for subsequent evaluation with respect to a clock source.

A measuring transducer, for example a thermocouple or the like, or a thermo-sensitive quartz is coupled to an oscillator, to control the frequency of the oscillator as a function of the measured condition, for example temperature. Quartz crystals change their frequency with respect to temperature, although the change is only small. A pulse generator is coupled to the oscillator, to convert the frequency of oscillations received therefrom to a sequence of pulses in which the time duration of the pulse gaps is representative of the frequency, and hence of the measured condition, for example temperature. A light generator is coupled to and controlled by the pulse generator, to produce light flashes or pulses, the spacing of which will be representative of the frequency of oscillations of the oscillator, and hence of the measured condition. The light flashes can be directly connected to a photodetector in an evaluation unit or can be transmitted via optical light guides or light fibers to such an evaluaiton unit, as desired.

In a preferred embodiment, a controlled frequency divider is connected to the pulse generator in advance thereof to control the division ratio.

The system has the advantage that malfunction or disturbances of either the sensor or the evaluation system or, in turn, of a transmission system, can readily be checked by merely providing light irradiation of the respective transducer element converting the sensed parameter into light pulses. Thus, by merely irradiating the measuring element, transmission to the sensor, or transmission of light pulses from the sensor can readily be checked; similarly, the measuring unit can be subjected to light by merely irradiating the measuring element, or, respectively, the input to the evaluation unit. Thus, any disassembly of connecting lines or the like, can be avoided. Preferably, the evaluation unit is equipped with a control indicator which reacts to the received light pulses so that the light pulses which are received at the evaluation unit can be made visible to operating personnel. Thus, utilization of light pulses within the visible spectrum permits direct monitoring of the transducer unit and the connecting lines as well as the input system to the evaluation unit. Use of optical fibers permits interference-free signal transmission without requiring any specific noise suppression or signal disturbance elimination circuitry or elements. Additionally, light guides are mechanically stable and hardly affected by high temperatures which may arise in high temperature heat transmissions, so that the light guides can be placed in close proximity to, for example, steel pipes without requiring any special high temperature insulation.

DRAWINGS

FIG. 1a shows the general association of a sensor, pulse generator, light generator, and evaluation unit, in schematic block diagram form;

FIG. 1b illustrates the pulses generated in the system of FIG. 1a;

DETAILED DESCRIPTION

Figure 1:
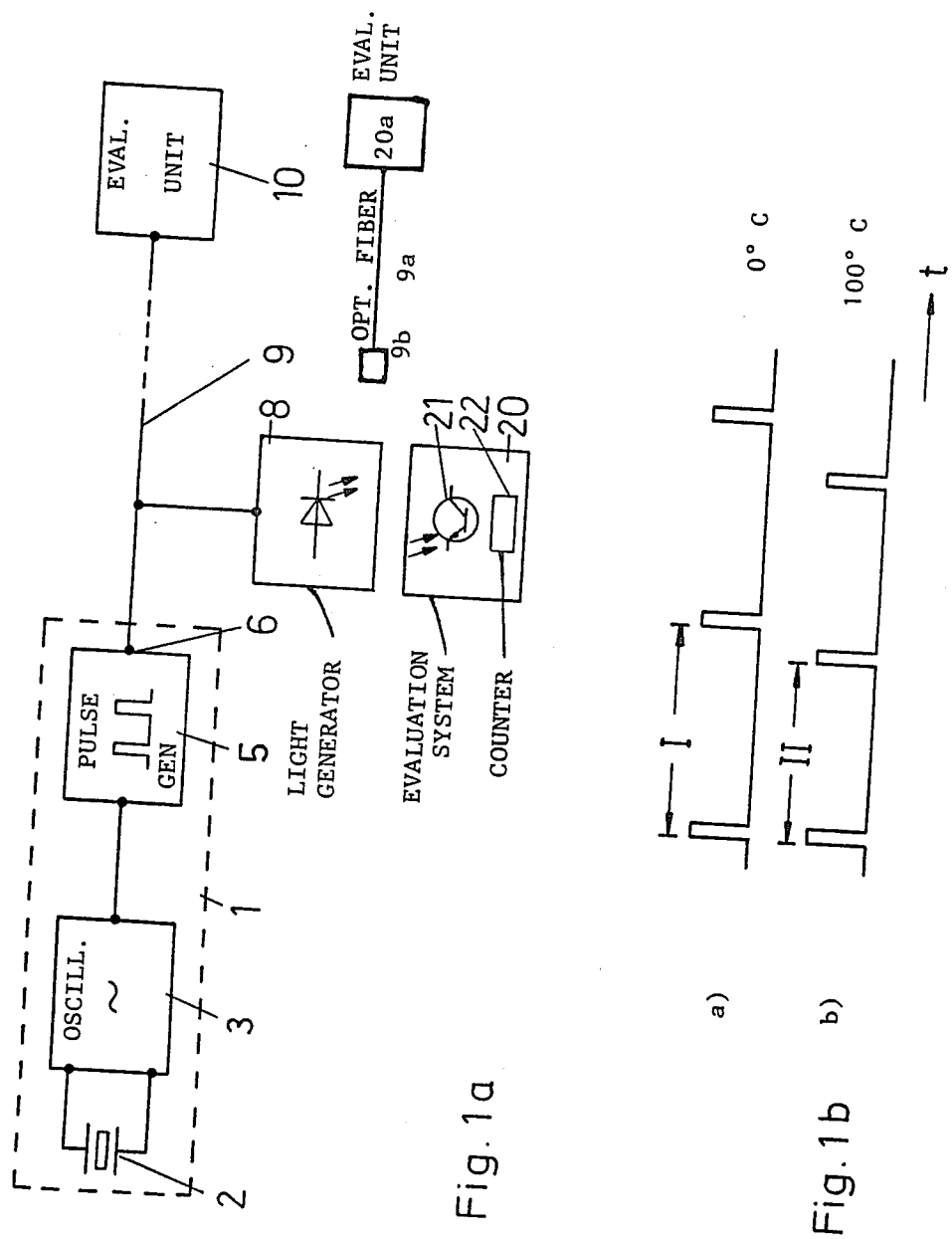

The sensor system—see FIG. 1—has a sensor unit which includes a sensing element 2 and an oscillator 3. The sensing element 2 forms the actual temperature transducer. The output of the oscillator 3 is coupled to a pulse generator 5. In accordance with a feature of the invention, a light generator 8 is coupled to the output terminal 6 of the pulse generator 5, which converts electrical impulses generated by the pulse generator 5 into optical or light pulses which, preferably, are within the visible spectrum. The radiation received from the light generator 8, for example a light-emitting diode (LED) is directed to an evaluation unit 20 containing a photodetector 21, for example a photo-sensitive transistor, coupled in light receiving relationship to the light generator 8. A counter 22 provides a time base, and permits evaluation of the timing of pulse gaps between light pulses. Counter 22 is suitably connected to the photo-sensitive element 21. Alternatively, or additionally, light from the light generator 8 is connected to a light pickup 9b, which receives light emitted from the light generator 8. The pickup 9b is coupled through a light guide or fiber optic 9a to an evaluation unit 20a which may be similar to the evaluation unit 20, that is, include a light-to-electrical signal transducer 21, a counter 22 and the like.

The output 6 of the pulse generator 5 is, preferably but not necessarily, connected over an electric line 9 with a stationary evaluation unit 10 of 20. Of course, rather than using the electric line 9, the pickup 9b and fiber optic 9a may be used, to transmit light directly received from the light generator 8, for transmission to the evaluation unit 20a which then must be fitted with a photodetector, for example a photo-transistor 21.

OPERATION

The sensing element 2, which may be a temperature sensitive quartz, coupled to determine the frequency of the oscillator 3, directly influences the oscillator frequency. Pulses generated by the pulse generator 5, coupled to receive the variable frequency of the oscillator 3, then provide a representative value of the measuring parameter sensed by the transducer 2, for example temperature. Of course, other parameters may be sensed, for example pressure, for which quartz of an oscillator also is an excellent transducer.

The primary field of application of the invention is sensing of temperature. For this application, the transducer 2 is a quartz which determines the frequency of oscillation of the oscillator 3, that is, is the frequency determinative element therein. Other types of oscillators may be used, for example inductance/capacitative oscillators, in which the inductance L or the capacity C can be influenced by parameters other than temperature. Such LC oscillators may be used, for example, to measure humidity or pressure. In either case, use of a piezo-electric element as the frequency determinative unit for the oscillator 3 is also possible.

The relationship between the sensed parameter - typically temperature—and the pulses obtained in time gap modulation is shown in FIG. 1b. In the example shown, a temperature of 0° C. provides for pulse gaps of 0.500 seconds, as shown at I of curve (a). Upon rise of temperature to 100° C., the pulse gap drops to 0.495 seconds, as shown at II, in curve (b). Although the change in time is small, it can readily be evaluated by use of a counter having a clock rate which is substantially higher than the expected change in time within the temperature time being measured.

Figure 2:
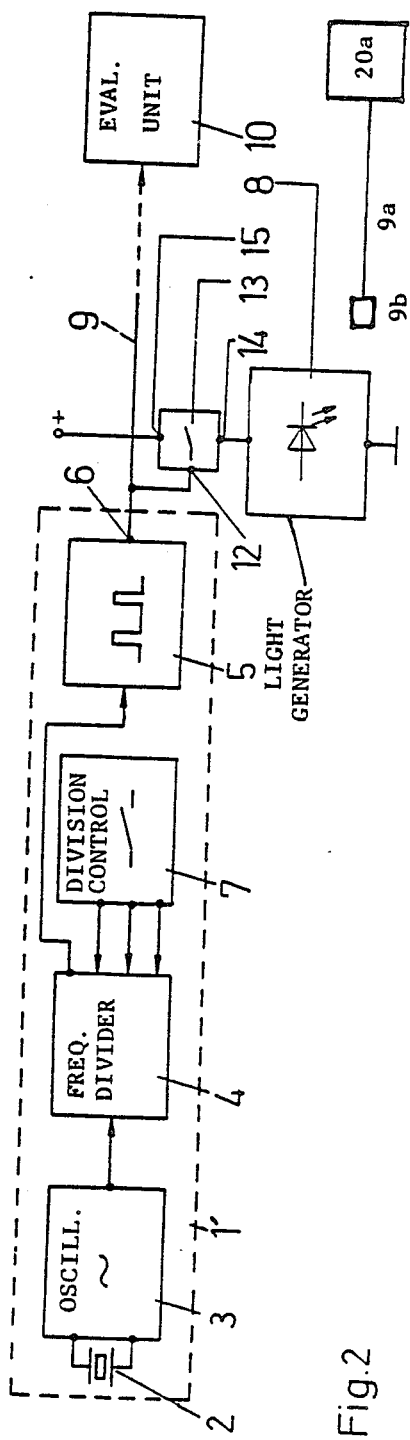
FIG. 2 is a more detailed block circuit diagram of the arrangement of FIG. 1.

In the embodiment of FIG. 2, oscillator 3 with the sensing quartz determines the frequency. Of course, the oscillator 3 may also be coupled to a LC tank circuit, connected, for example, as a Hartley oscillator, or to an oscillator which does not have a LC tank circuit. Quartz oscillators without LC tank circuits are particularly suitable.

In accordance with a feature of the invention, the output of oscillator 3 is coupled to the input of a controllable frequency divider 4. The frequency division ratio is used to correct the tolerances of a quartz 2, and is controllable by means of the division control unit 7, shown schematically merely as a switching circuit. The output of the frequency divider 4 then is connected to the input of the pulse generator 5, the output circuit 6 of which provides pulses of constant pulse width, with, however, variable pulse gaps, and in which the duration of the pulse gaps depends on the measured parameter.

The output 6 of the pulse generator is connected to the control input 12 of an electrical switching element 13, shown merely as a mechanical switch but which may, of course, be an electronic switch. In actual practice, switching transistors have been found particularly suitable, in which case the terminal 12 forms the base terminal of the switching transistor, and terminals 14, 15 the collector-emitter terminals, respectively. A light generator 8, typically a light emitting diode, is serially connected through the main current carrying path of the switching transistor formed by element 13. Current supply is shown only schematically, as well known.

An electric line 9 is connected in parallel to the control line to terminal 12 of the switch 13. This electric line 9 is connected to the evaluation unit 10 which, if only light is used as the signal transmission source, may then serve only as a current supply; alternatively, it may also provide for electric energy supply to the oscillator and sensor. Of course, and as is frequently desirable, the sensing unit 1' can be electrically independent, for example by being battery-powered. Amplifiers can be used, as desired, and the line 9, alternatively, can be coupled to terminal 14 of the transistor switch 13 to make use of its inherent amplification.

Figure 3:
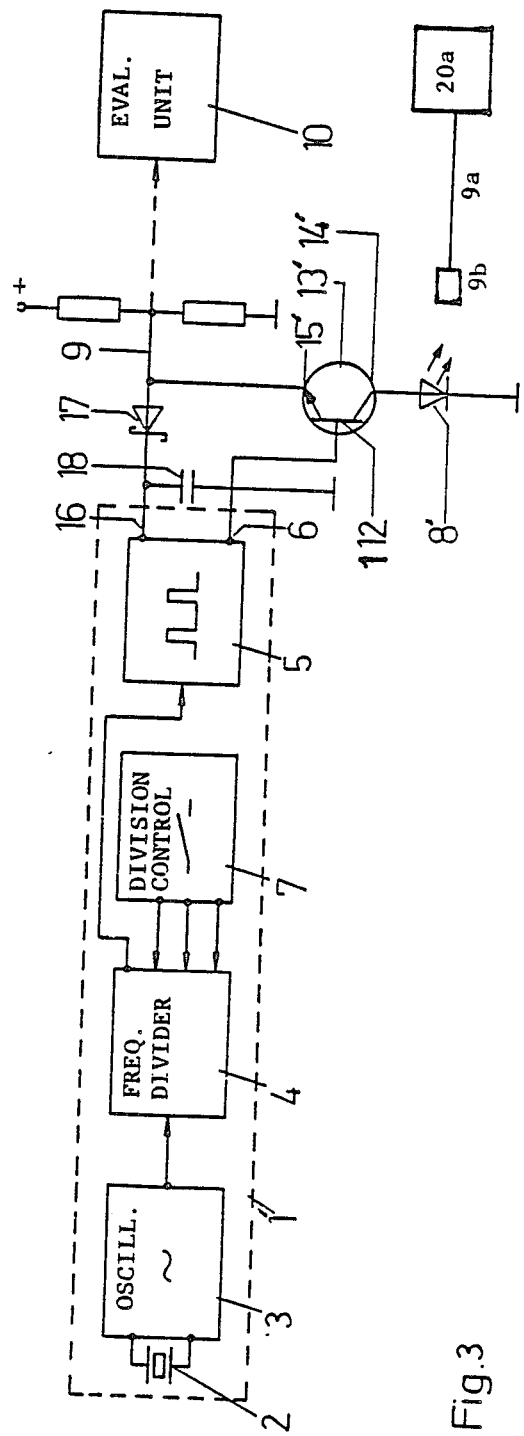
FIG. 3 shows the electrical circuit to obtain light pulses.

The detailed circuit is shown in FIG. 3. The pulse generator 5 has its output 6 connected to the base 112 of a transistor 13' forming the switch 13. The collector-emitter path has, serially connected, a light emitting diode (LED) 8' serially connected thereto. The current supply circuit 16 of the pulse generator 5, together with the entire sensor unit 1'', is coupled through diode 17 with the emitter terminal 15' of the transistor 13', the collector 14' of which is coupled to the LED 8'. Current supply is provided, as shown schematically, by a voltage divider connected between positive and negative terminals of a supply source. The electric line 9 can be used, simultaneously, to transfer pulses to the evaluation unit 10, as well as to provide power supply. A capacitor 18 buffers the current supply of the pulse generator 5 when the pulse generator 5 provides output pulses.

The LED 8' need not provide visible light; it may provide red light, or, for example, radiation in the infrared region. A laser diode may be used.

If a quartz crystal 2 is used as the parameter-dependent sensor, the change of the pulse gap durations may be up to 10% of the overall pulse gaps. This change, of course, depends on the sensed parameter. Counter 22 (FIG. 1a) may be of any suitable construction, and operating at a clock which is high with respect to the change in pulse duration based on change in parameter.

We claim:
1. A method of wirelessly transmitting and reading out signals which are being generated in the form of electrical signals by a remote measuring sensor, especially a temperature sensor, comprising the steps of
subjecting a quartz crystal (2) to a physical parameter;
coupling said quartz crystal to an oscillator (3) and generating (5) electrical signals as a sequence of pulses in which gaps between pulses represent a specific measured value of said parameter, especially temperature level;
providing a time base (20);
converting the electrical signals into light impulses;
detecting (21) and evaluating (22), at a location remote from said crystal (2) and oscillator (3), the light impulses with respect to said time base, and indicating or reading out results of said evaluating step.

2. The method of claim 1, wherein the step of evaluating the light impulses with respect to said time base comprises
reconverting the light impulses into electrical signals; and evaluating the electrical signals with respect to clock pulses.

3. The method of claim 2, including the step of transmitting said light pulses after conversion thereinto over a distance prior to reconverting the light pulses into electrical signals.

4. The method of claim 1, wherein said pulse-generating step comprises changing the duration of said gap between pulses by up to 10% of a maximum value thereof, over a predetermined maximum range of said physical parameter.

5. System for sensing and evaluating a measurable condition or parameter including
an oscillator (3);
a quartz measuring transducer (2) coupled to the oscillator (3) and converting the frequency received therefrom to a sequence of pulses in which the time duration of pulse gaps is representative of said frequency and hence of the measured condition;
a light generator (8, 8') coupled to and controlled by the pulse generator and providing light flashes or pulses, the spacing of which is representative of the frequency of oscillations of the oscillator and hence of the measured condition;
means (9b) for detecting said light pulses and converting them to electrical signals; and
means (20a), coupled to said detecting means, for evaluating said electrical signals and indicating values of the measured condition.

6. System according to claim 5, further comprising a frequency divider (4) coupled between the oscillator (3) and the pulse generator (5).

7. System according to claim 6, wherein the frequency divider has a controllable frequency ratio;
and a control switching circuit (7) controlling the division factor of the frequency divider to permit correction of tolerances of the measuring transducer.

8. System according to claim 5, wherein the measuring transducer (2) comprises a piezoelectric element.

9. System according to claim 8, wherein the measuring transducer (2) comprises a frequency determining quartz element.

10. System according to claim 5, further including an electronic switch (13) having a control terminal (12) connected to the output (6) of the pulse generator;
and a light generator (8) connected serially in the main current path (14, 15) of the electronic switch (13).

11. System according to claim 10, wherein the light generator (8) is a light emitting diode (LED) (8').

12. System according to claim 10, wherein the light generator (8) comprises a laser diode.

13. System according to claim 10, wherein the light generator emits humanly perceptible visible light.

14. System according to claim 5, wherein the light generator (8) emits infrared light.

15. System according to claim 5, further including an optical-to-electrical signal transducer (21) optically responsible to the light emitted by the light generator (8,8') and optically coupled thereto.

16. System according to claim 15, further including a light pickup (9b), and a light guide, or fiber optic (9a), the light pickup (9b) being optically coupled to the light generator and the light guide or fiber optic being optically coupled to the optical-electrical transducer (21).

17. System according to claim 15, further including a counter (22) receiving light pulses from the optical-electrical transducer, and comparing the gaps between said pulses with a counter clock.

18. System according to claim 16, further including a counter (22) receiving light pulses from the optical-electrical transducer, and comparing the gaps between said pulses with a counter clock.

19. System according to claim 16, wherein the time duration of the pulse gaps, changing as a result of change in said measured condition or parameter, is in the order of about 10% of the time duration between gaps.

20. System according to claim 17, further including a counter (22) receiving light pulses from the optical-electrical transducer, and comparing the gaps between said pulses with a counter clock.

* * * * *